(12) United States Patent
Gerami et al.

(10) Patent No.: US 11,321,725 B2
(45) Date of Patent: May 3, 2022

(54) SYSTEM AND METHOD FOR MONETIZING ADVERTISING IN A GAMING OR VIRTUAL SYSTEM

(71) Applicants: Shervin Gerami, Ashburn, VA (US); Aaron Pawloski, Potomac Falls, VA (US)

(72) Inventors: Shervin Gerami, Ashburn, VA (US); Aaron Pawloski, Potomac Falls, VA (US)

(*) Notice: Subject to any disclaimer, the term of this patent is extended or adjusted under 35 U.S.C. 154(b) by 0 days.

(21) Appl. No.: 16/811,604

(22) Filed: Mar. 6, 2020

(65) Prior Publication Data
US 2020/0286114 A1    Sep. 10, 2020

Related U.S. Application Data

(60) Provisional application No. 62/814,539, filed on Mar. 6, 2019.

(51) Int. Cl.
*G06Q 30/02* (2012.01)
*A63F 13/79* (2014.01)
*A63F 13/86* (2014.01)
*G06Q 10/10* (2012.01)
(Continued)

(52) U.S. Cl.
CPC ......... *G06Q 30/0209* (2013.01); *A63F 13/61* (2014.09); *A63F 13/79* (2014.09); *A63F 13/86* (2014.09); *G06Q 10/10* (2013.01); *G06Q 30/0246* (2013.01); *G06Q 30/0255* (2013.01); *G06Q 30/0271* (2013.01); *G06Q 30/0273* (2013.01); *G06Q 30/0277* (2013.01); *G06Q 50/18* (2013.01); *A63F 2300/5506* (2013.01);
(Continued)

(58) Field of Classification Search
CPC .................................................. G06Q 30/02
See application file for complete search history.

(56) References Cited

U.S. PATENT DOCUMENTS

| 10,478,729 B1* | 11/2019 | Wells ................. A63F 13/60 |
| 2004/0148221 A1* | 7/2004 | Chu ................. G06Q 30/0251 |
| | | 705/14.51 |

(Continued)

FOREIGN PATENT DOCUMENTS

| KR | 20020023095 A | * | 3/2002 | ............ G06F 17/60 |
| WO | WO 2004/068278 A2 | * | 8/2004 | ............ G06Q 10/08 |
| WO | WO 2013/013281 A1 | * | 1/2013 | ............ A63F 13/00 |

OTHER PUBLICATIONS

Marios C. Angelides; Harry Agius, Rated A for Advertising: A Critical Reflection on In-Game Advertising (English), Wiley-IEEE Press 2014 (Edition: 1, pp. 784), Jan. 1, 2014 (Year: 2014).*

(Continued)

*Primary Examiner* — Marilyn G Macasiano
(74) *Attorney, Agent, or Firm* — Mark H. Whittenberger; Holland & Knight LLP

(57) ABSTRACT

The present disclosure relates to a system and method for use with video and online gaming. Embodiments may include providing, using at least one processor, a video game or online game and integrating an application programming interface with the video game or online game. Embodiments may include displaying an advertisement on a three dimensional ("3D") or four dimensional ("4D") object associated with the video game or online game.

17 Claims, 4 Drawing Sheets

(51) Int. Cl.
*G06Q 50/18* (2012.01)
*A63F 13/61* (2014.01)

(52) U.S. Cl.
CPC . *A63F 2300/5546* (2013.01); *A63F 2300/577* (2013.01); *A63F 2300/8082* (2013.01)

(56) References Cited

U.S. PATENT DOCUMENTS

| | | | | |
|---|---|---|---|---|
| 2010/0017725 | A1* | 1/2010 | McCarthy | H04W 4/021 |
| | | | | 715/745 |
| 2010/0070858 | A1* | 3/2010 | Morris | H04N 21/4788 |
| | | | | 715/706 |
| 2010/0205035 | A1* | 8/2010 | Baszucki | G06Q 30/0277 |
| | | | | 705/14.12 |
| 2013/0124311 | A1* | 5/2013 | Sivanandan | G06Q 30/02 |
| | | | | 705/14.51 |

OTHER PUBLICATIONS

Lupinek, J.M; Yoo, J.; Chu, E.A.; Bownlee, E., Congruity of virtual Reality In-Game Advertising, Frontiers in Sports and Active Living, 3, 728749, Oct. 12, 2021 (Year: 2021).*

Herrewijn, Laura; Poels, Karolien, Recall and Recognition of in-game advertising: the role of game control, Frontiers in Psychology, 4, 1023, Jan. 34, 2014 (Year: 2014).*

Marion C. Angelides; Harry Agius, Rated A for Advertising: A Critical Reflection on In-Game Advertising (English), Handbook of Digital Games, Wiley-IEEE Press 2014 (Edition: 1, pp. 784), Jan. 1, 2014 (Year: 2014).*

* cited by examiner

SYSTEM AND METHOD FOR MONETIZING ADVERTISING IN A GAMING OR VIRTUAL SYSTEM

CROSS REFERENCE TO RELATED APPLICATIONS

This application claims the benefit of U.S. Provisional Application No. 62/814,539, filed on 6 Mar. 2019, the entirety of which are incorporated herein by reference.

FIELD OF THE INVENTION

The embodiments of the present disclosure relate to a gaming system, and more particularly, to a method for monetizing aspects of a gaming system.

BACKGROUND

A multiplayer video game is a video game in which more than one person can play in the same game environment at the same time, either locally or online over the internet. Multiplayer games often require players to share the resources of a single game system or use networking technology to play together over a greater distance. Players may compete against one or more human contestants, work cooperatively with a human partner to achieve a common goal, supervise other players' activity, co-op, etc. Multiplayer games allow players interaction with other individuals in partnership, competition or rivalry, providing them with social communication absent from single-player games. Often, in a multiplayer video game environment each individual user may have an avatar that represents that user on the display during the game.

SUMMARY

Accordingly, an embodiment of the present disclosure is directed to a computer-implemented method for use with video or online gaming. The method may include providing, using at least one processor, a video game or online game and integrating an application programming interface with the video game or online game. The method may further include displaying an advertisement on a three dimensional ("3D") or four dimensional ("4D") object associated with the video game or online game.

One or more of the following features may be included. In some embodiments, the method may include determining the advertisement based upon, at least in part, one or more of a game user, a developer, an advertising agency, or an advertiser. The method may also include determining a number of views of the advertisement. The advertisement may be targeted marketing that is based upon at least one of a player of the video game or online game, an amount of time spent playing the video game or online game, a transaction process of the video game or online game, one or more spectators of the video game or online game through a third party platform, or in-game stats associated with the video game or online game. The method may include generating an exclusive advertising contract, monitoring use of the video game or online game, and determining a compensation amount for the user based upon, at least in part, the contract and the use. The method may further include allowing a user to enable a display of the advertisement with an avatar associated with the user. The video game or online game may be associated with a virtual reality application or an augmented reality application.

In another embodiment of the present disclosure a computer-readable storage medium having stored thereon instructions, which when executed by a processor result in a number of operations is provided. Operations may include providing, using at least one processor, a video game or online game and integrating an application programming interface with the video game or online game. Operations may further include displaying an advertisement on a three dimensional ("3D") or four dimensional ("4D") object associated with the video game or online game.

One or more of the following features may be included. In some embodiments, the method may include determining the advertisement based upon, at least in part, one or more of a game user, a developer, an advertising agency, or an advertiser. Operations may also include determining a number of views of the advertisement. The advertisement may be targeted marketing that is based upon at least one of a player of the video game or online game, an amount of time spent playing the video game or online game, a transaction process of the video game or online game, one or more spectators of the video game or online game through a third party platform, or in-game stats associated with the video game or online game. Operations may include generating an exclusive advertising contract, monitoring use of the video game or online game, and determining a compensation amount for the user based upon, at least in part, the contract and the use. Operations may further include allowing a user to enable a display of the advertisement with an avatar associated with the user. The video game or online game may be associated with a virtual reality application or an augmented reality application.

In yet another embodiment of the present disclosure a computing system for use with video or online gaming is provided. The system may include at least one processor configured to provide, using at least one processor, a video game or online game and integrate an application programming interface with the video game or online game. The at least one processor may be further configured to display an advertisement on a three dimensional ("3D") or four dimensional ("4D") object associated with the video game or online game.

One or more of the following features may be included. In some embodiments, the method may include determining the advertisement based upon, at least in part, one or more of a game user, a developer, an advertising agency, or an advertiser. The at least one processor may be further configured to determine a number of views of the advertisement. The advertisement may be targeted marketing that is based upon at least one of a player of the video game or online game, an amount of time spent playing the video game or online game, a transaction process of the video game or online game, one or more spectators of the video game or online game through a third party platform, or in-game stats associated with the video game or online game. The at least one processor may be further configured to generate an exclusive advertising contract, monitoring use of the video game or online game, and determining a compensation amount for the user based upon, at least in part, the contract and the use. The at least one processor may be further configured to allow a user to enable a display of the advertisement with an avatar associated with the user. The video game or online game may be associated with a virtual reality application or an augmented reality application.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
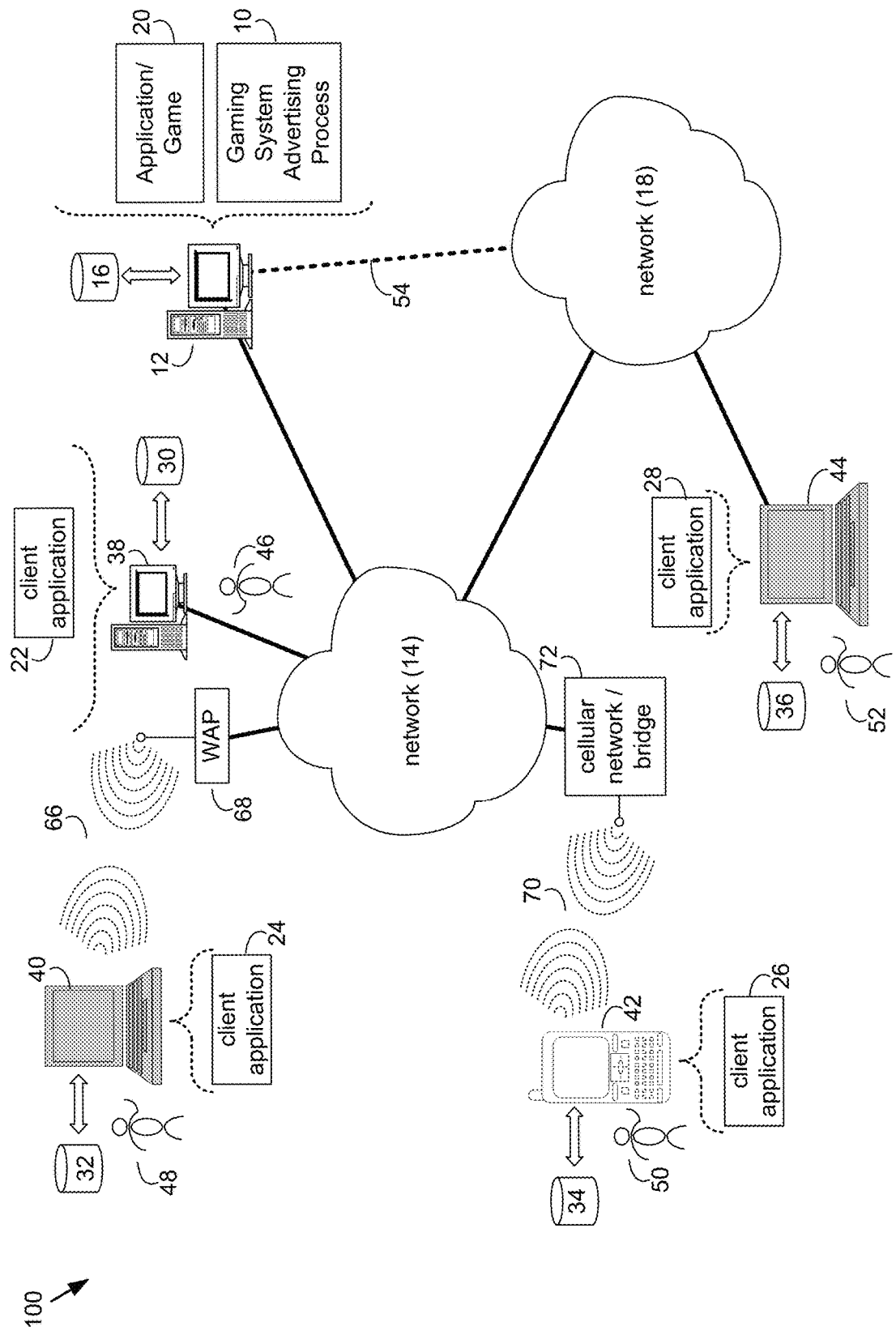
FIG. 1 diagrammatically depicts a gaming system advertisement process coupled to a distributed computing network.
Figure 2:
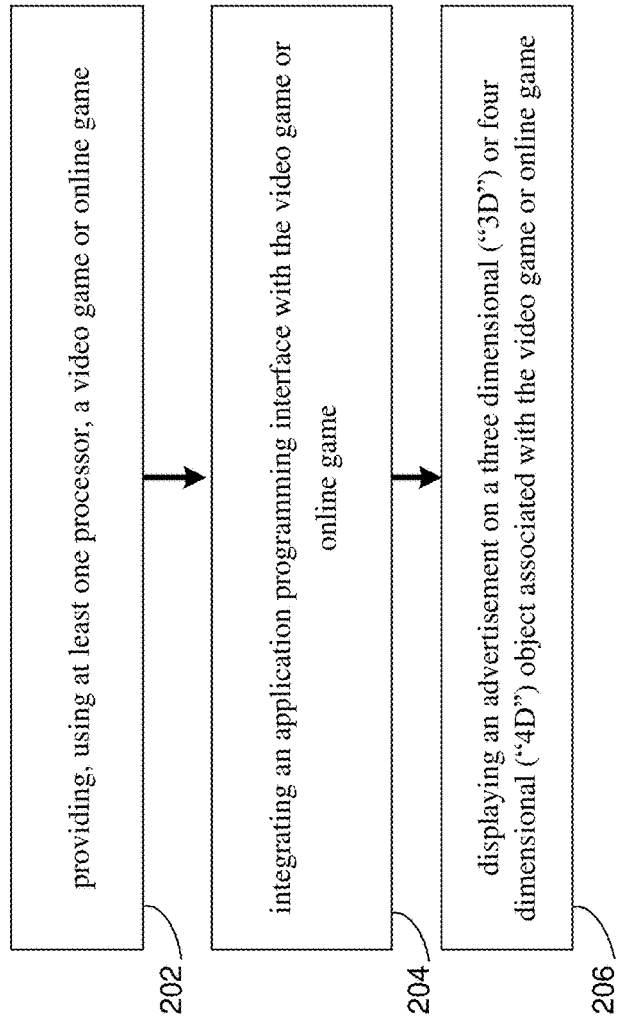
FIG. 2 is an exemplary flowchart of a gaming system advertisement process according to an embodiment of the present disclosure.

Referring to FIG. 1, there is shown an gaming system advertising process 10 that may reside on and may be executed by computer 12, which may be connected to network 14 (e.g., the Internet or a local area network). Examples of computer 12 may include, but are not limited to: a personal computer, a server computer, a series of server computers, a mini computer, and a mainframe computer. Computer 12 may be a web server (or a series of servers) running a network operating system, examples of which may include but are not limited to: ANDROID™, iOS™, Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, gaming system advertising process may reside on and be executed, in whole or in part, by a client electronic device, such as a personal computer, notebook computer, personal digital assistant, or the like.

The instruction sets and subroutines of gaming system advertising process 10, which may include one or more software modules, and which may be stored on storage device 16 coupled to computer 12, may be executed by one or more processors (not shown) and one or more memory modules (not shown) incorporated into computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types.

Computer 12 may execute a web server application, examples of which may include but are not limited to: Microsoft IIS, Novell Webserver™, or Apache® Webserver, that allows for HTTP (e.g., HyperText Transfer Protocol) access to computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Computer 12 may execute an application (e.g., application 20). Application 20 may interact with one or more client applications (e.g., client applications 22, 24, 26, 28). Application 20 and/or client applications 22, 24, 26, 28, etc. may be referred to herein as a game, video game system, multi-player game, or the like.

Gaming system advertising process 10 may be a stand-alone application, or may be an applet/application/script that may interact with and/or be executed within application 20. In addition/as an alternative to being a server-side process, gaming system advertising process may be a client-side process (not shown) that may reside on a client electronic device (described below) and may interact with a client application (e.g., one or more of client applications 22, 24, 26, 28). Further, gaming system advertising process 10 may be a hybrid server-side/client-side process that may interact with application 20 and a client application (e.g., one or more of client applications 22, 24, 26, 28). As such, gaming system advertising process may reside, in whole, or in part, on computer 12 and/or one or more client electronic devices.

In some embodiments, gaming system advertising process 10 and/or application 20 may be independent web applications accessible via the Internet. In some embodiments, gaming system advertising process 10 and/or application 20 may be executable applications within a web page or web site accessible via the Internet.

The instruction sets and subroutines of application 20, which may be stored on storage device 16 coupled to computer 12 may be executed by one or more processors (not shown) and one or more memory modules (not shown) incorporated into computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access application 20 and may allow users to e.g., utilize gaming system advertising process 10.

Users 46, 48, 50, 52 may access application 20 directly through the device on which the client application (e.g., client applications 22, 24, 26, 28) is executed, namely client electronic devices 38, 40, 42, 44, for example. Users 46, 48, 50, 52 may access application 20 directly through network 14 or through secondary network 18. Further, computer 12 (e.g., the computer that executes application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Embodiments of gaming system advertising process 10 may be configured to work with one or more video games, online games, etc. Gaming system advertising process 10 may be configured to generate advertisements as skins on any three dimensional ("3D") or four dimensional ("4D") object or avatar in a given game. In addition, gaming system advertising process 10 may provide the ability to infuse key senses to the platform for advertising purposes as well. In some embodiments, the exchange may be driven through an integrated application programming interface ("API") that may be placed into the game, which may build into the game various capabilities. Some of these may include, but are not limited to, a system to overlay any advertising skin on any 3D or 4D object or other system of media delivery, a mechanism for an advertising agency or advertiser to market their product through custom user skins, or 3D or 4D object replacement, etc.

In some embodiments, gaming system advertising process 10 may incorporated, wholly or partly, as part of a virtual advertising marketplace ("VAM"), also referred to herein as an "exchange". The VAM may operate using any or all of the devices and cloud-based devices shown in FIG. 1.

In some embodiments, advertising placement may be based on one or more potential parties. Some of these may include, but are not limited to, the game user (their benefit is that they get payed for allowing their avatar to be advertised on, and they receive money for spending a lot of time playing games), the developer (the developer creates another source of revenue), the advertising agency (advertising agency has another medium to deliver advertising for their clients), the advertiser (another medium for viewing their products), etc.

In some embodiments, the agreement may be based on the following options: terms of use, smart contracts, payola systems, etc. In some embodiments, the transaction of the exchange may be based upon the number of views of the advertisement from one or more viewers playing the game that view the add on screen, the number of views from other platforms (e.g., YouTube, Twitch, etc.), combinations thereof, etc. The game user may receive money that may be based on the number of views per hour they receive, a total number of views, a percentage of advertisement views received (e.g., determined by proximity of user to add placement) the advertising that is placed on their avatar, combinations thereof, etc. The developer may receive money based on total number, a percentage of advertisement views received (e.g., determined by proximity of user to add placement).

In some embodiments, targeted marketing may be based on one or more factors. These factors may be analyzed by the exchange and derived into certain psychographics and demographics. Some factors may include, but are not limited to, players of the game, amount of time spent on game, transaction process of the game, spectators of the game through various platforms, console videos, in game stats (e.g., Wins and Losses or definition and in game currency), etc.

In some embodiments, the exchange may also allow a mechanism for the following parties to create exclusive contracts for advertising, for which the game user receives money. This system can be driven through the exchanges auction system or through direct contract. Some parties may include, but are not limited to, a game user (may be identified by advertiser, agency, or developer that the user will be a key advertising medium), advertiser (e.g., identifies a developer or game user, which may be the advertising medium(s) for their ads to be placed), developer (e.g., identifies a game user or advertiser for specific advertiser, or game user), advertisement agency (e.g., identifies a developer, and game user). In some embodiments, users and advertisement agencies can enter exclusive contracts within the exchange for set periods of time, set prices or dynamic pricing based on exchange calculations. Additionally and/or alternatively, developers and advertisement agencies may enter exclusive contracts within the exchange or set periods of time, set prices or dynamic pricing based on exchange calculations.

In some embodiments, gaming system advertising process 10 may include one or more graphical user interfaces that may one or more front facing features, per audience. In some embodiments, the game user may select the games that have signed up to the exchange and agree that their avatar may be allowed to be advertised on. The players' stats may be displayed from the game (determined since the API is built into the game) to determine tier of player, value, and interest. Those factors may determine how much money may be received per hour of game played. Additionally and/or alternatively, the developer may choose what aspects of the API to assign to their game to be used. For example, skins advertising, object advertising, when specific 3D or 4D objects are used, etc. In some embodiments, the exchange has the option to place an advertisement based object representative to the game, but assigned by specific advertiser, etc. For example, if a burger is present in the game, now the exchange may place a Big Mac, if a third party ((e.g., McDonald's) wants any burger 3D object to be a Big Mac)), and integration of key metrics that the API has found for the developer. In some embodiments, the developer may see the amount of advertisement revenue generated by advertisements, to players and to themselves. With regard to the advertising agency/advertiser, the user may view the demographics and psychographic options for advertisements, select a specific game, platform, game user name or demo/psychographic that they want advertising to be placed on his or her game user avatar, 3D object or any other mediums (senses). The graphical user interface may allow the advertiser to upload their needed graphics or advertisement into the system, which the exchange may use to place advertisements against key items.

In some embodiments, the gaming system advertising process 10 may include the following aspects. For example, the developer may integrate the API into their game, who may then monetize on a percentage of revenue of advertisements generated from skins from game users, who have agreed to be advertisements and 3D and 4D objects that the game allows to be advertisement placements. A game user may agree to have their avatar be, or allow for, an advertisement placement, which the exchange may pay them on a per hour basis, based on the advertising amount of dollars hits their avatar. The exchange may obtain a percentage of all transactions as a fee for performing the algorithm, eyes, and skin placements, as needed. Exchange dynamic pricing payouts may be based on formula calculations using following data points (e.g., number of total players, total hours played, number of advertisers and viewers of advertisements) which also may be incorporated into an auction system, in which pricing is determined by market.

In some embodiments, marketing events may be included as the exchange may provide a mechanism for 'pay for view' events via television, internet streaming, Twitch, YouTube between game developers, advertisers, eSports teams and event attendees and event promotors. In some embodiments, the gaming system advertising process described herein may be used with virtual and/or augmented reality based applications.

Figure 3:
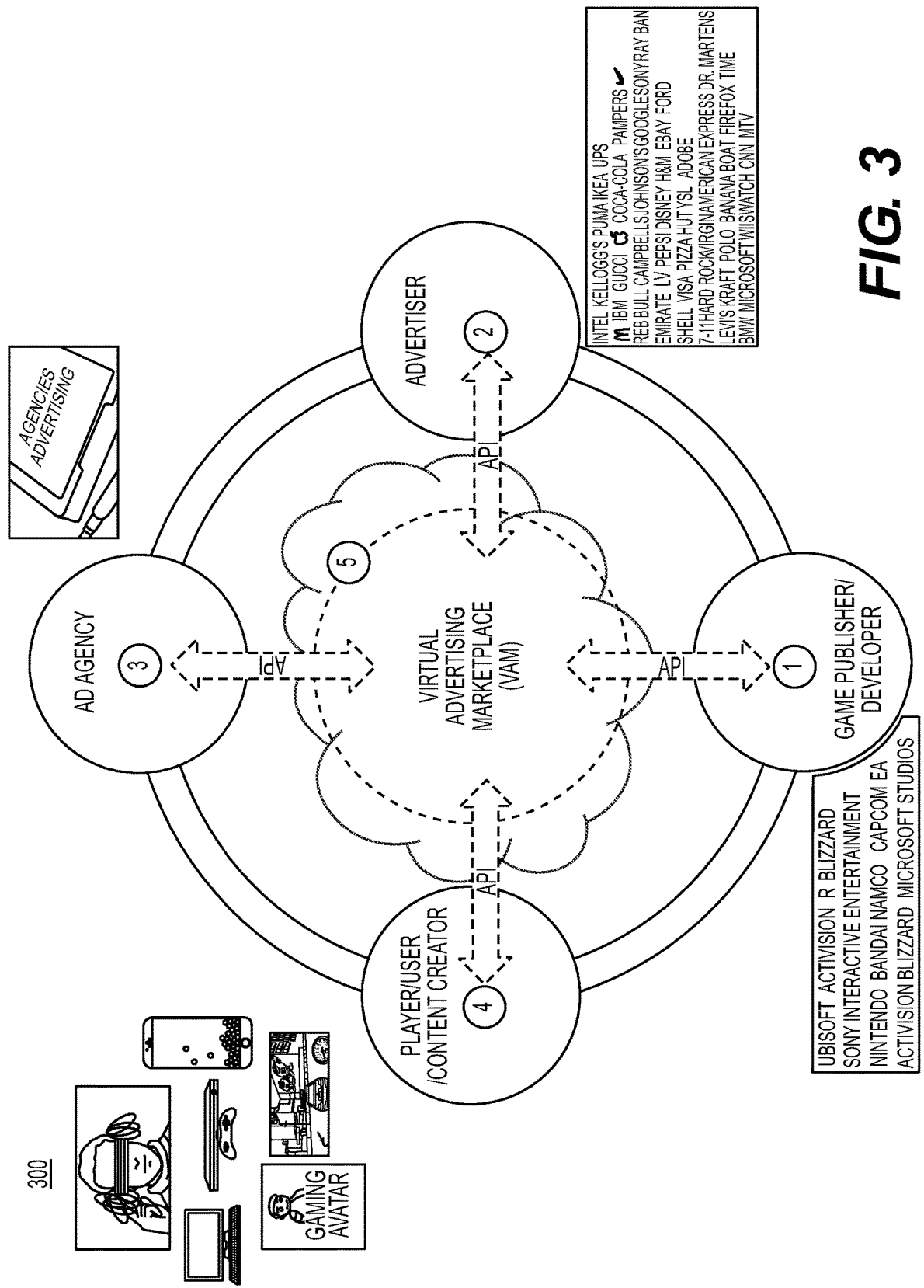
FIG. 3 is a diagram consistent with embodiments of gaming system advertisement process.

Referring now to FIG. 3 a diagram 300 showing a gaming system advertising process 10 coupled to a distributed computing network such as that shown in FIG. 1. Process 10 may enable a virtual advertising marketplace ("VAM") (also referred to herein as the "exchange") as is discussed in further detail below.

In operation, in a first step, a game publisher/developer may integrate an API into aspects of a specific game (e.g., in-game 3D/4D objects, avatars, skins etc.) to allow for advertising from the VAM. In the second step, the advertiser may leverage API to the VAM to enter into exclusive contracts, determine which games allow for advertising and provides uploading capabilities of brand specific advertising to in game objects. In the third step, the advertising agency may leverage the API to the VAM to initiate exclusive contracts or provide access data (e.g., demographic data across games, platforms, game user names, etc.). In the fourth step, a player/user/content creator may leverage the exchange to enter into exclusive contracts or to pick the games on the exchange to 'opt-in' to allow advertising to in-game 'skins' for a specific user ID in exchange for money.

In some embodiments, gaming system advertising process 10 and the cloud-based VAM performs various operations, some of which are provided below. Process 10 may provide the ability to add advertising capability to any 3D/4D object in a virtual system. Gaming system advertising process 10 may be configured to provide targeted marketing analytics (e.g., in-game stats, players demographic information, amount of time spent, spectators/followers by user ID). Additionally and/or alternatively, gaming system advertising process 10 may enable exclusive advertising contracts between advertisers and players/users/content creators and game publishers.

In some embodiments, gaming system advertising process 10 may enable transaction tracking and payment per initiated API algorithm function, upload/downloads from the exchange, integrated API object call per UserID per game, initiated contracts, views of advertisements, etc.

In some embodiments, gaming system advertising process 10 may be associated with pay-per-view events. Process 10 may also enable auction style contracts based on dynamic pricing calculations (determined by marketplace usage).

Figure 4:
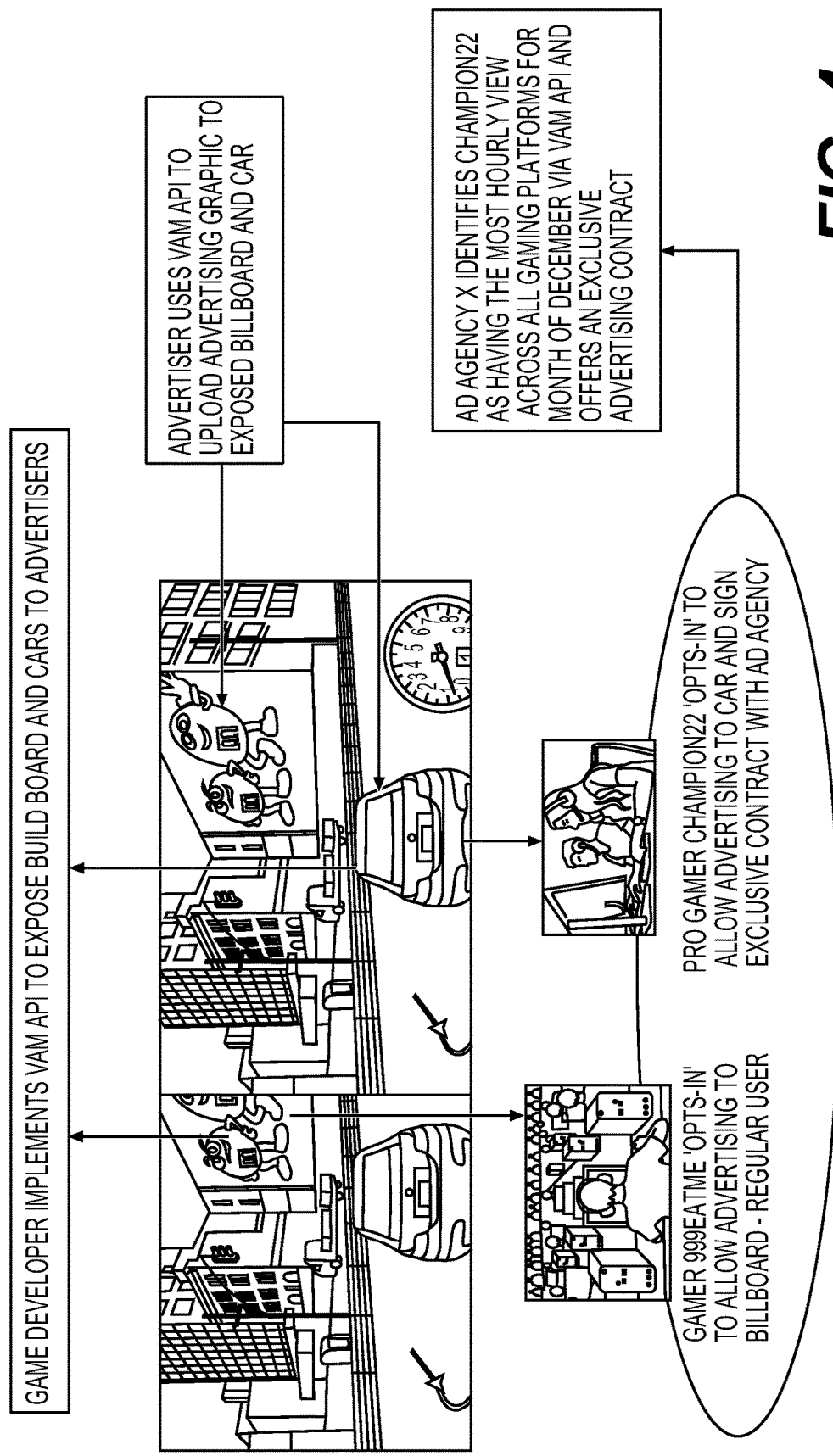
FIG. 4 is a graphical user interface consistent with embodiments of gaming system advertisement process.

Referring now to FIG. 4, a graphical user interface 400 showing transaction examples via the exchange is provided. In this particular example, the game developer may implement VAM API to expose build board and cars to advertisers. The advertiser may use the VAM API to upload the advertising graphic to the exposed billboard and the car, as shown in the Figure. The advertising agency may identify a particular user (in this example "champion 22") as having the most hourly views across all gaming platforms for a particular timeframe (e.g., daily, weekly, monthly, yearly, etc.) via VAM API and offer an exclusive advertising contract. The process may allow standard users (e.g., "999") to opt-in to the advertising offer to allow for advertising to the billboard while a professional gamer (e.g., champion 22) may opt-in to allow advertising on the car and may be provided with an option to sign an exclusive contract with the advertising agency.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber optic cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

What is claimed is:

1. A computer-implemented method comprising:
   providing, using at least one processor, a video game or online game;
   integrating an application programming interface with the video game or online game;
   allowing a game user to enable a display of an advertisement with an avatar associated with the game user;
   displaying the advertisement on a three dimensional ("3D") or four dimensional ("4D") avatar associated with the video game or online game, wherein the advertisement is targeted marketing that is based upon, at least in part, one or more of an amount of time spent playing the video game or online game, a transaction process of the video game or online game, one or more spectators of the video game or online game through a third party platform, or in-game stats associated with the video game or online game; and
   enabling communication via the API with a virtual advertising marketplace that communicates electronically via one or more APIs with each of a game developer, an advertiser, an advertising agency, and a game user.

2. The computer-implemented method of claim 1, further comprising:
   determining the advertisement based upon, at least in part, a game user.

3. The computer-implemented method of claim 1, further comprising:
   determining a number of views of the advertisement.

4. The computer-implemented method of claim 1, wherein the advertisement is targeted marketing that is based upon a skill level of a player of the video game or online game.

5. The computer-implemented method of claim 1, further comprising:
   generating an exclusive advertising contract;
   monitoring use of the video game or online game; and
   determining a compensation amount for the user based upon, at least in part, the contract and the use.

6. The computer-implemented method of claim 1, wherein the video game or online game is associated with a virtual reality application or an augmented reality application.

7. The computer-implemented method of claim 1, wherein the advertisement is targeted marketing that is based upon an amount of time spent playing the video game or online game.

8. The computer-implemented method of claim 1, wherein the advertisement is targeted marketing that is based upon a transaction process of the video game or online game.

9. The computer-implemented method of claim 1, wherein the advertisement is targeted marketing that is based upon one or more spectators of the video game or online game through a third party platform.

10. The computer-implemented method of claim 1, wherein the advertisement is targeted marketing that is based upon in-game stats associated with the video game or online game.

11. The computer-implemented method of claim 1, further comprising:
    allowing a game developer to enable a display of an advertisement with an avatar associated with the game user.

12. A non-transitory computer-readable storage medium having stored thereon instructions, which when executed by a processor result in the following operations:

providing, using at least one processor, a video game or online game;

integrating an application programming interface with the video game or online game;

allowing a game user to enable a display of an advertisement with an avatar associated with the game user;

displaying the advertisement on a three dimensional ("3D") or four dimensional ("4D") avatar associated with the video game or online game, wherein the advertisement is targeted marketing that is based upon, at least in part, one or more of an amount of time spent playing the video game or online game, a transaction process of the video game or online game, one or more spectators of the video game or online game through a third party platform, or in-game stats associated with the video game or online game; and enabling communication via the API with a virtual advertising marketplace that communicates electronically via one or more APIs with each of a game developer, an advertiser, an advertising agency, and a game user.

13. The computer-readable storage medium of claim 12, further comprising:

determining the advertisement based upon, at least in part, an advertising agency.

14. The computer-readable storage medium of claim 12, further comprising:

determining a number of views of the advertisement.

15. The computer-readable storage medium of claim 12, wherein the advertisement is targeted marketing that is based upon a player of the video game or online game, an amount of time spent playing the video game or online game, a transaction process of the video game or online game, one or more spectators of the video game or online game through a third party platform, and in-game stats associated with the video game or online game.

16. The computer-readable storage medium of claim 12, further comprising:

generating an exclusive advertising contract;

monitoring use of the video game or online game; and determining a compensation amount for the user based upon, at least in part, the contract and the use.

17. The computer-readable storage medium of claim 12, wherein the video game or online game is associated with a virtual reality application or an augmented reality application.

* * * * *